Sept. 21, 1948.  E. S. CORNELL  2,449,842
WORK GAUGE

Filed Oct. 6, 1943  3 Sheets-Sheet 1

Inventor
Elton S. Cornell

Sept. 21, 1948. E. S. CORNELL 2,449,842
WORK GAUGE
Filed Oct. 6, 1943 3 Sheets-Sheet 2

Inventor
Elton S. Cornell

Sept. 21, 1948. E. S. CORNELL 2,449,842
WORK GAUGE
Filed Oct. 6, 1943 3 Sheets-Sheet 3

Inventor
Milton S. Cornell
Wright Brown Quinby & May,
Attys.

Patented Sept. 21, 1948

2,449,842

UNITED STATES PATENT OFFICE 2,449,842

WORK GAUGE

Elton S. Cornell, Charlestown, N. H., assignor to Bryant Chucking Grinder Company, Springfield, Vt., a corporation of Vermont Application October 6, 1943, Serial No. 505,170

4 Claims. (Cl. 33—178)

In the gaging of peripherally grooved or threaded work, where the gaging action is desired within the grooves or between the threads, it is evident that during a gaging action, the work piece being gaged is held against removal by the gaging elements. Where less than all of the gage elements or anvils are retracted from contact with the work when the gage is opened after a gaging action, lateral motion of the work piece away from the fixed gaging element or elements is required to free it therefrom. When the work piece is supported for gaging on a fixed member, this lateral motion of the work piece is accompanied by a frictional sliding motion of the work piece on its supporting member, first toward the fixed element or elements as the movable element or elements are moved into gaging position, and then in the opposite direction to free the work piece for removal. Particularly when the work piece is heavy, this frictional drag may interfere with complete motion of the work piece to gaging position, resulting in an inaccurate gaging, and it adds to the labor in placing and removing the work pieces to be or which have been gaged.

An object of the present invention, therefore, is to provide a support for the work piece which is movable therewith between gaging and loading positions for the work and without substantial friction.

A further object of the invention is to so mount the work piece support that not only may it move with the work piece between gaging and releasing positions, but which is also yieldable laterally of such work piece motion, this lateral motion commonly being vertical, to facilitate proper engagement of the gaging elements or anvils within the work grooves or between the threads, preventing "cross threading" of threaded work.

For a complete understanding of this invention, reference may be had to the accompanying drawings in which Figure 1 is a fragmentary top plan view of an external thread gage embodying this invention.

Figures 2 and 3 are sectional views on lines 2—2 and 3—3, of Figures 1 and 2, respectively.

Figure 1:
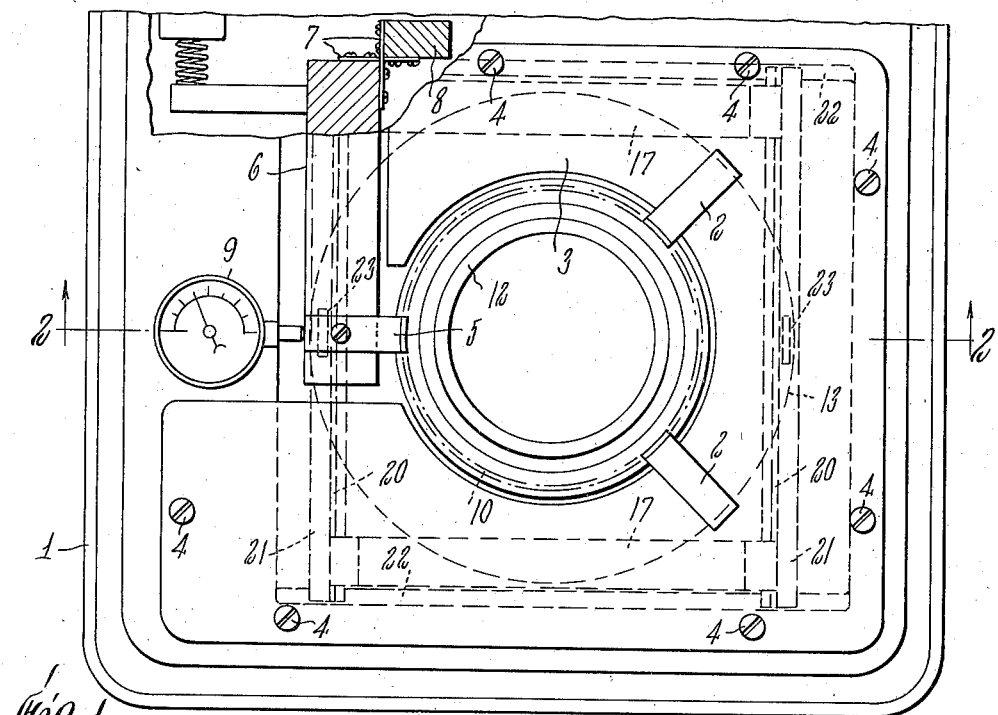
Figure 2:
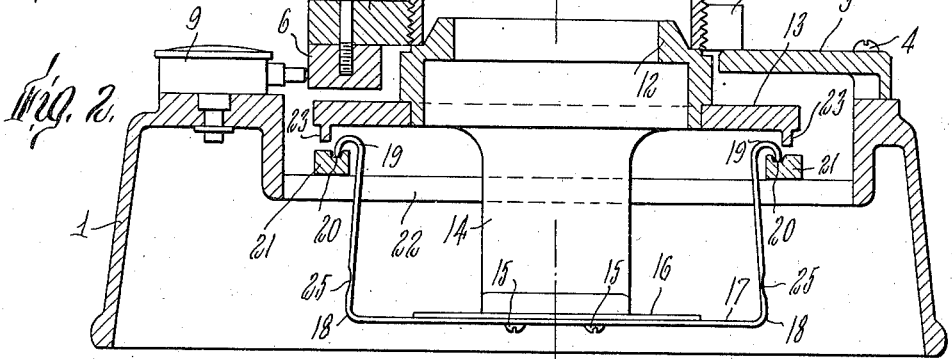
Figure 3:
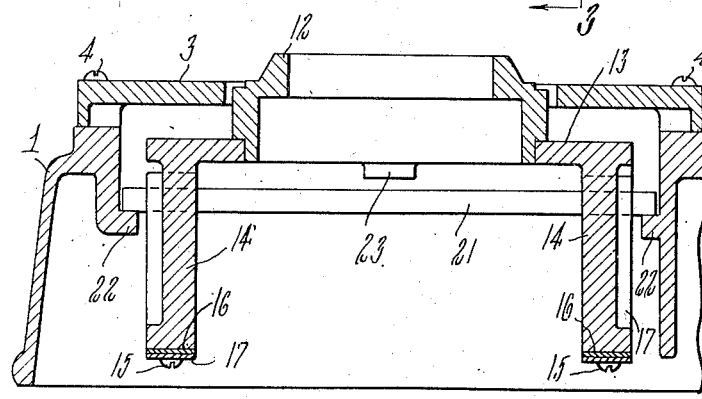

Referring first to the constructions shown in Figures 1 to 3, at 1 is indicated a bed or stand which supports the gaging elements. Three gaging anvils are shown for gaging the work, two of these anvils at 2 being carried by a support 3, fixed to the top face of the bed 1 as by screws 4. At 5 is shown a movable anvil, this being carried by an arm 6 which may be pivoted as by crossed leaf springs 7 from an upright support 8 to swing in a horizontal plane toward and from the fixed anvils 2, a suitable indicator 9 actuated by motion of the arm 6, as is well understood in the art, being employed to show the gaged diameter of the work when all three of the anvils are in engagement therewith. These gaging elements may be mounted in any suitable manner, the particular mounting not being per se a part of the present invention. It will be evident, however, that work being in gaging relation to the anvils, as shown at 10 in Figure 2, when the movable anvil is moved away from the work it releases the work therefrom, but the work is still in engagement with the fixed anvils 2 which engage between the external threads of the work, or in case of externally grooved work within the work grooves, and the work is therefore not free to be lifted off from the gage until it is moved laterally out of contact with the fixed anvils.

In accordance with this invention the work is supported for gaging on a support 12 carried by a platform 13. This platform 13 is provided with a pair of downwardly extending feet 14, each of which rests at its lower ends on the upper leaf 16 of a cross spring strip 17 secured thereto as by screws 15. The opposite ends of the springs 7 are bent upwardly at 18 and the upper extremities of these strips are turned outwardly and downwardly as at 19 and are pivotally supported in grooves 20 in the upper face of a pair of cross frame members 21 bridging depressed wall portions 22 of the bed 1. Stop lugs 23 depending from the platform 13 above the member 21 limit the downward motion of the platform. Above the bends 18 these spring strips or hangers 17 are shown as thinned as at 25, these thin portions providing points of flexure of the strips so as to permit the lower portions of the strip 17 to be deflected laterally. These thin portions 25 are arranged to flex in the direction of motion of the work piece when moving toward or from the fixed anvils 2 and provide for the work support 12 a substantially frictionless laterally yieldable mounting having some tendency to take a mid position, with the work clearing the fixed anvils, but yieldable readily when the movable anvil 5 presses thereagainst to move the work into engagement with the fixed anvils 2, this being a gaging position for the work piece. Likewise the work support is yieldable vertically through its spring supporting hangers so that proper engagement of the anvils with the faces of the threads or in grooves in the work may be insured and without liability of cross threading of threaded work.

Figure 4:
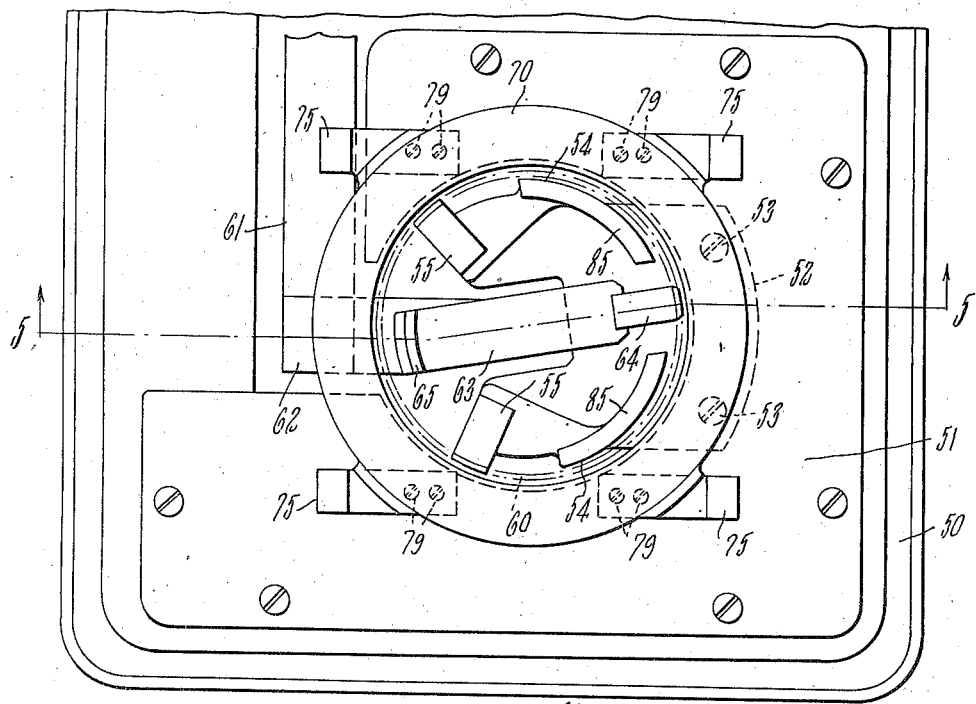
Figure 4 is a view similar to Figure 1, but showing the invention embodied in an internal thread gage.
Figure 5:
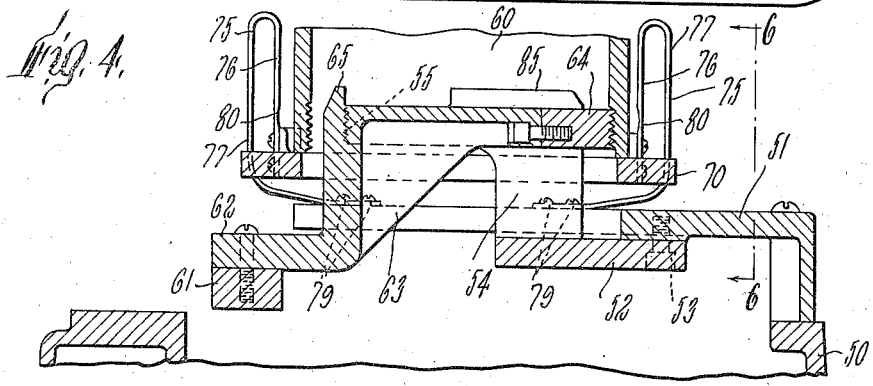
Figure 5 is a sectional view on line 5—5 of Figure 4.
Figure 6:
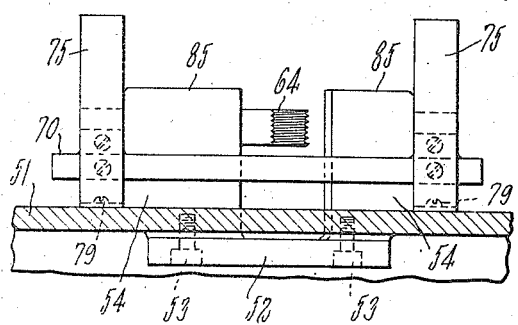
Figure 6 is a detail sectional view on line 6—6 of Figure 5.

In Figures 4 to 6 a modification is shown particularly suitable for gaging internally threaded or grooved work. The stand 50 for this gage carries an arcuate support 51 to the under face of which is secured a yoke shaped plate 52, as by screws 53, this plate 52 having a pair of upstanding portions 54 to the upper faces of which are secured a pair of fixed gaging anvils 55 for engagement with internal thread faces of the work 60. At 61 is shown a movable gaging lever to which is secured a member 62 having an upstanding arm 63 to one end of which is secured a movable anvil 64. This arm 63 also has at its opposite end a pilot portion 65, which, when the gage is opened, engages with a smooth face against the internal threads of the work piece and may retract it from contact with the stationary thread gaging anvils 55. The work 60 is arranged to be supported on an annular platform 70 which is supported from the member 51 by four U-shaped leaf spring hangers 75. Each of these leaf springs has a vertical arm 76 secured to the outer edge of the work support 70 and a vertical arm 77, the lower end of which is turned inwardly and secured to the top face of the member 51 as by the screws 79. These spring supports 70 permit the work to be moved freely laterally substantially in line with the motion of the movable anvil 64 in its gaging or retracting motions, and permits the abutment 65 to engage the work and swing the work with its supporting platform away from engagement with the fixed gaging anvils 55 when the gage is opened. The leaf springs 75 may be formed with thinned portions 80 in their arms 76 to facilitate this motion, while the springs themselves are sufficiently strong to support the work piece but with sufficient flexure of the in-turned lower ends of the arms 77 possible to permit axial adjustment of the work with relation to the gaging anvils. The member 52 which carries the fixed anvils may also be provided with arcuate upstanding guide portions 85, serving as pilots to facilitate the placing of the work piece.

Figure 7:
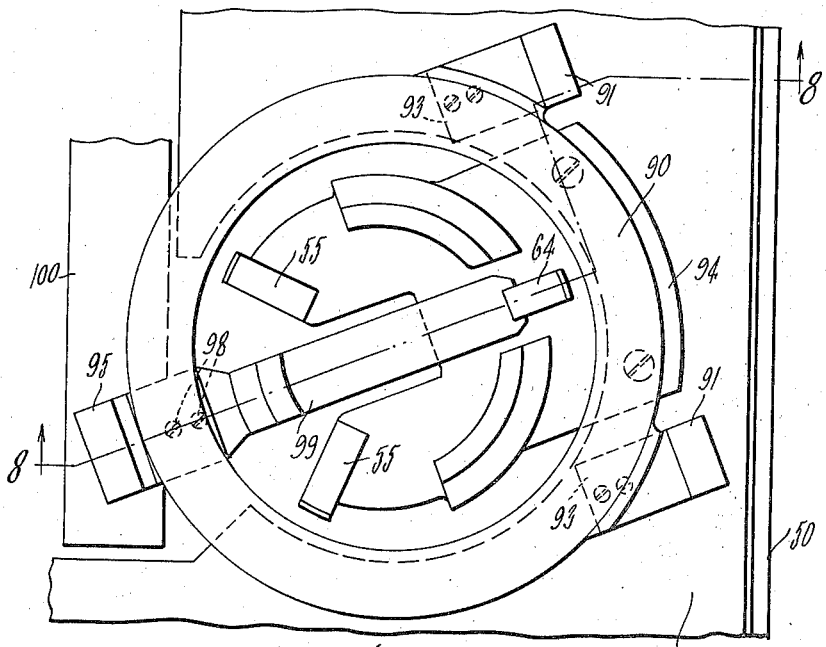
Figure 7 is a fragmentary view similar to a portion of Figure 1, but showing a modification.
Figure 8:
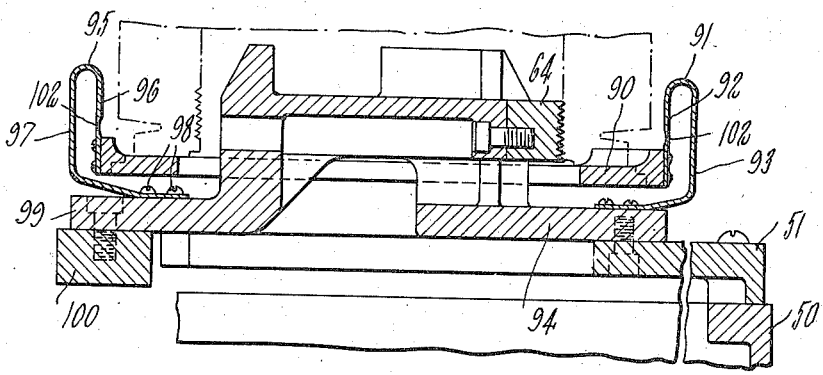
Figure 8 is a detail sectional view on line 8—8 of Figure 7.

In Figures 7 and 8 a modification of the structure shown in Figures 4 to 6 is illustrated in which instead of carrying the work support entirely from the bed of the machine, it is supported partly by this bed and partly by the movable anvil-supporting arm. As illustrated in these figures, the work supporting platform 90 is carried by a pair of U-shaped leaf spring hangers 91, each having an inner arm 92 secured to the work support 90 and an outer inturned arm 93 secured to the top face of the fixed anvil support 94. A third spring hanger 95 similar to the hangers 91 has its inner downwardly extending arm 96 secured to the work support 90, but its outer downwardly and inwardly extending arm 97 is secured as by screws 98 to the upper face of the movable anvil 99 supported on the swinging arm 100. As in the case of the other spring supports shown, each may be provided with a thinned portion 102 to provide a portion of greater flexibility to permit the desired free lateral motion of the work supporting platform, while the substantially horizontal portion of the outer arm of each of the spring hangers provides for the desired vertical motion to permit proper engagement of the anvils on the work.

From the foregoing description of certain embodiments of this invention it will be evident to those skilled in the art that further embodiments and various other modifications may be made without departing from the spirit or scope of the invention.

I claim:

1. A gage comprising a bed, a plurality of gaging anvils carried by said bed and relatively movable to gage and release a work piece, at least one of said anvils being stationary with respect to said bed, a support for an article to be gaged, and means on said bed carrying said support with capability of swinging motion in the general direction of motion of said movable anvil to carry an article thereon to and from gaging relation to said stationary anvil.

2. A gage comprising a bed, a plurality of gaging anvils carried by said bed and relatively movable to gage and release a work piece, at least one of said anvils being stationary with respect to said bed, a support for an article to be gaged, and means on said bed carrying said support with capability of swinging motion to carry an article thereon to and from gaging relation to said fixed anvil, said support being yieldable transverse to its direction of motion toward and from gaging relation to said fixed anvil.

3. A gage comprising a bed, a plurality of gaging anvils carried by said bed and relatively movable to gage and release a work piece, at least one of said anvils being stationary with respect to said bed, a support for an article to be gaged by said anvils, and hangers pivotally connecting said support and bed in position to permit swinging motion of said support to bring an article to be gaged on said support to and from gaging relation to said fixed anvil.

4. A gage comprising a bed, a plurality of gaging anvils carried by said bed and relatively movable to gage and release a work piece, at least one of said anvils being stationary with respect to said bed, a support for an article to be gaged by said anvils, and hangers pivotally connecting said support and bed in position to permit swinging motion of said support to bring an article to be gaged on said support to and from gaging relation to said fixed anvil, said hangers being yieldable to permit said support to move transverse to the swinging direction.

ELTON S. CORNELL.

REFERENCES CITED

The following references are of record in the file of this patent:

UNITED STATES PATENTS

| Number | Name | Date |
|---|---|---|
| 1,491,613 | Miller | Apr. 22, 1924 |
| 1,617,005 | Ames | Feb. 8, 1927 |
| 2,254,812 | Aller | Sept. 2, 1941 |

FOREIGN PATENTS

| Number | Country | Date |
|---|---|---|
| 344,335 | Germany | Nov. 19, 1921 |
| 354,177 | Germany | July 2, 1924 |